(12) United States Patent
Aronoff et al.

(10) Patent No.: US 8,610,977 B2
(45) Date of Patent: Dec. 17, 2013

(54) COLOR TARGET AUTHENTICATED USING GRAYSCALE INFORMATION

(75) Inventors: Jason S. Aronoff, Fort Collins, CO (US); Steven J. Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 174 days.

(21) Appl. No.: 13/258,284

(22) PCT Filed: Apr. 21, 2009

(86) PCT No.: PCT/US2009/041229
§ 371 (c)(1),
(2), (4) Date: Sep. 21, 2011

(87) PCT Pub. No.: WO2010/123497
PCT Pub. Date: Oct. 28, 2010

(65) Prior Publication Data
US 2012/0019879 A1 Jan. 26, 2012

(51) Int. Cl.
*H04N 1/46* (2006.01)
(52) U.S. Cl.
USPC .......................... 358/505; 358/1.15; 347/20
(58) Field of Classification Search
USPC .......... 358/1.15, 505, 1.9, 1.12; 347/19, 20, 9
See application file for complete search history.

(56) References Cited

U.S. PATENT DOCUMENTS

| | | | | |
|---|---|---|---|---|
| 4,924,078 | A | * | 5/1990 | Sant'Anselmo et al. ...... 235/494 |
| 5,278,816 | A | * | 1/1994 | Russell .................... 369/109.02 |
| 5,800,368 | A | * | 9/1998 | Klingemann et al. ............ 602/1 |
| 5,946,414 | A | * | 8/1999 | Cass et al. ...................... 382/183 |
| 6,065,400 | A | * | 5/2000 | Van Weverberg ............. 101/181 |
| 6,141,441 | A | * | 10/2000 | Cass et al. ...................... 382/166 |
| 6,152,070 | A | * | 11/2000 | Fairbairn et al. .............. 118/719 |
| 6,577,061 | B2 | * | 6/2003 | Sano et al. ..................... 313/582 |
| 6,791,707 | B2 | * | 9/2004 | Laverty et al. ............... 358/1.15 |
| 6,874,639 | B2 | * | 4/2005 | Lawandy ........................ 209/3.3 |
| 7,089,678 | B2 | * | 8/2006 | Novak et al. .................... 33/706 |
| 7,907,502 | B2 | * | 3/2011 | Nishikiori et al. .......... 369/275.4 |
| 8,469,480 | B2 | * | 6/2013 | Veenstra ......................... 347/19 |
| 2008/0088860 | A1 | | 4/2008 | Yoshida |

FOREIGN PATENT DOCUMENTS

| | | |
|---|---|---|
| KR | 100225151 | 10/1999 |
| WO | WO-9603021 | 10/1996 |

OTHER PUBLICATIONS

International Searching Authority, International Search Report and The Written Opinion, 11 pages, Dec. 2009.

* cited by examiner

*Primary Examiner* — Negussie Worku
(74) *Attorney, Agent, or Firm* — Steven L. Webb

(57) ABSTRACT

A color target is disclosed. The color target comprises a plurality of marks or features. Each of the plurality of marks can be one of a plurality of colors. Each of the plurality of colors has a corresponding grayscale value that is spaced apart by a predetermined amount.

16 Claims, 3 Drawing Sheets

COLOR TARGET AUTHENTICATED USING GRAYSCALE INFORMATION

BACKGROUND

Targets or devices can be used for authentication, tracking, anti-counterfeiting, inspection of products, or other applications in which intentionally embedded information can later be read and used for one or more purposes. The targets can be printed on, or attached to, the packaging for products. The targets or devices typically contain information encoded into the device. The information may be encoded into the device using a pattern of black and white, grayscale, or color features, patches or lines. One example is a bar code, which can be used for point-of-sale, product tracking and stenographic data carrying simultaneously.

Color based targets or devices provide additional complexity and data density as compared to grayscale or black and white targets. This increase is largely due to the increase in total possible combinations which are feasible as deterrents are switched from black and white to grayscale to color. For a single mark or feature, black and white provides 2 possible choices, 8-bit grayscale provides $2^8$ possible choices, and 24-bit color provides $2^{24}$ possible choices. As the number of marks per device increase, the total possible combinations for a color based device far exceeds the total possible combinations for a black and white or grayscale device. This makes the color target or devices more effective and more informational-dense.

The trade-off in moving from black and white or grayscale to color is that the computational complexity in evaluating a mark or feature in a device directly increases with the possible combinations. This computation complexity occurs in several areas including, but not limited to, increased, data storage, memory usage, and selection of image processing algorithms used to correctly identify and decode, a mark or feature. In addition, scanning a device in color may be slower than scanning the same device in black and white or grayscale.

DETAILED DESCRIPTION

FIGS. 1-4, and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
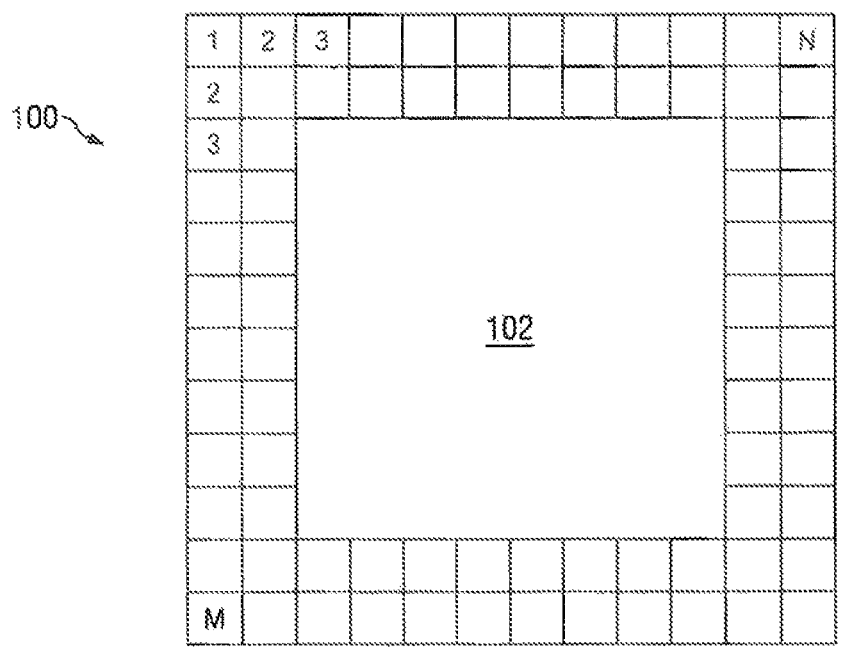
FIG. 1 is a color target 100 in an example embodiment of the invention.

FIG. 1 is a color target 100 in an example embodiment of the invention. Color target 100 is comprised of a plurality of individual marks or features. In this example embodiment of the invention, each of the plurality of marks or features is a rectangular area. In other embodiments the marks may have other shapes and may be arranged in different geometric patterns, for example triangles, circles or the like. Color target 100 has in rows and n columns of marks with an opening 102 in the center section of the device. In other embodiments, other information may be encoded in opening 102, or the device may be a solid square of marks with no opening in the center. Each of the plurality of marks or features may be a different color. When using 24 bit color, each mark or feature may be one of $2^{24}$ possible colors. Some marks or features in the color target 100 may not contain encoded information. Some marks may act as separators between encoded information, or act as decoys.

When the information encoded in color target 100 is decoded, the decoding may be done in grayscale space, and not in color space. The conversion from color space into grayscale space will typically take place during scanning. Some scanners have a single set of sensors and only detect one color or channel. These types of scanners are typically called either single channel scanners, black and white scanners, or grayscale scanners. Other scanners typically have three sets of sensors where each set of sensors detect a different color (typically red, green and blue) or wavelength band. These scanners are typically called color scanners or just scanners.

Single channel scanners output grayscale as a function of the different levels of light converted by the single set of sensors. The amount of light converted by the sensors is a function of the light output from the scanner light source, the reflection from the marks on the anti-counterfeiting device or target 100, the transmittance of the optics and filters in the scanner optical path, and the sensitivity of the sensor. Some single channel scanners have light sources that output light in a narrow wavelength band. A scanner that uses a light source with a narrow wavelength band may be unable to detect differences between colors on either side of the narrow wavelength bands.

Color scanners typically output grayscale as a function of the response of all three color channels. The function is typically a matrix that takes a percentage of each channel or color to determine the grayscale level for that color. For example, the National Television System Committee (NTSC) is a standard for converting color in the red, green and blue color space into grayscale by summing 33% of the red channel with 50% of the green channel and 17% of the blue channel for the value of the grayscale level (or Gray=$\frac{5}{16}$R+$\frac{9}{16}$G+$\frac{2}{16}$B). Some color scanners provide a selection of different conversion functions between color and grayscale. Some of the different conversion functions include, green channel only, red channel only, blue channel only, NTSC, or a user downloaded function. Because color scanners typically use information from all three color channels when creating a grayscale scan, the grayscale scan created using a color scanner can typically differentiate among a wider color space than grayscale scans created using a single channel scanner.

Color scanners manufactured by different vendors are typically calibrated to give a uniform response when scanning a specific color target. Therefore a wide variety of color scanners may give a consistent grayscale value when scanning a specific color mark when using a standard color to grayscale conversion function. Single channel scanners manufactured by different vendors will typically have a light source having a different specular output, a sensor with a different sensitivity, or a different filter in the optical path of the scanner. Therefore, single channel scanners from different vendors typically will not produce the same grayscale value when scanning the same color mark.

The material or substrate, the mark is printed on may also affect the grayscale response recorded by the scanner. For example, color marks printed on glossy paper may have a different scanned grayscale value than the same mark when printed on paper with a matte finish. The range of colors produced by a printer typically varies across printer types. For example a printer with only 3 different ink colors will typically have a smaller color gamut than a printer that has 6 different ink colors. Therefore when selecting colors for a mark that will be authenticated in grayscale space, the material or substrate the device will be printed on, the printer, ink types and number of inks used to print the device, and the scanner type used to scan the device, must be considered.

In one example embodiment of the invention, selection of the colors for the color target proceeds using the following steps:
1. Identify a set of original or initial colors that define the target color palette which will be used for printing the color target, for example—RGBCMY.
2. Select the specific printer model, and substrate (paper) which will be used.
3. Print in color, a set of test sheets having a range of color values across the target color palette.
4. Scan the printed test sheets, using the scanner type that will be used during authentication, to create a set of corresponding grayscale values.
5. Select a subset of color values from the range of color values wherein the grayscale values for each of the subset of color values are spaced apart with a predefined grayscale spacing.

The set of original or initial colors that define the target color palette can be selected as the colors with one or more channels fully saturated and one or more channels completely unsaturated. The six colors that have one or more channels fully saturated and one or more channels completely unsaturated are: red, green, blue, cyan, magenta, and yellow. In RGB color space, colors are defined by a triplet of numbers in the format (R, G, B) which represent the three color channels which can be adjusted to obtain the desired color. In 24-bit RGB color systems, each color channel is represented by 8 bits and can therefore have a range of 0 to 255. When all three channels are 0 the color is black and when all three channels are 255 the corresponding color is white. Full saturation occurs when the color channels required to define a color are at 255 and the remaining color channels are 0. For example, red is fully saturated at (255,0,0) and yellow is fully saturated at (255,255,0).

Once the set of original colors that define the target color palette have been determined, a set of test sheets can be printed on the substrate (paper) that will be used to produce the color target, using the specific printer model that will be used to produce the color target. In one example embodiment of the invention, the test sheets will contain a series of test squares or test features for each color in the set of original colors. Each series of test features may vary the saturation, hue, intensity or other quality of one of the colors in the set of original colors, resulting in a test sheet having features with a range of color values across the target color palette.

Figure 2:
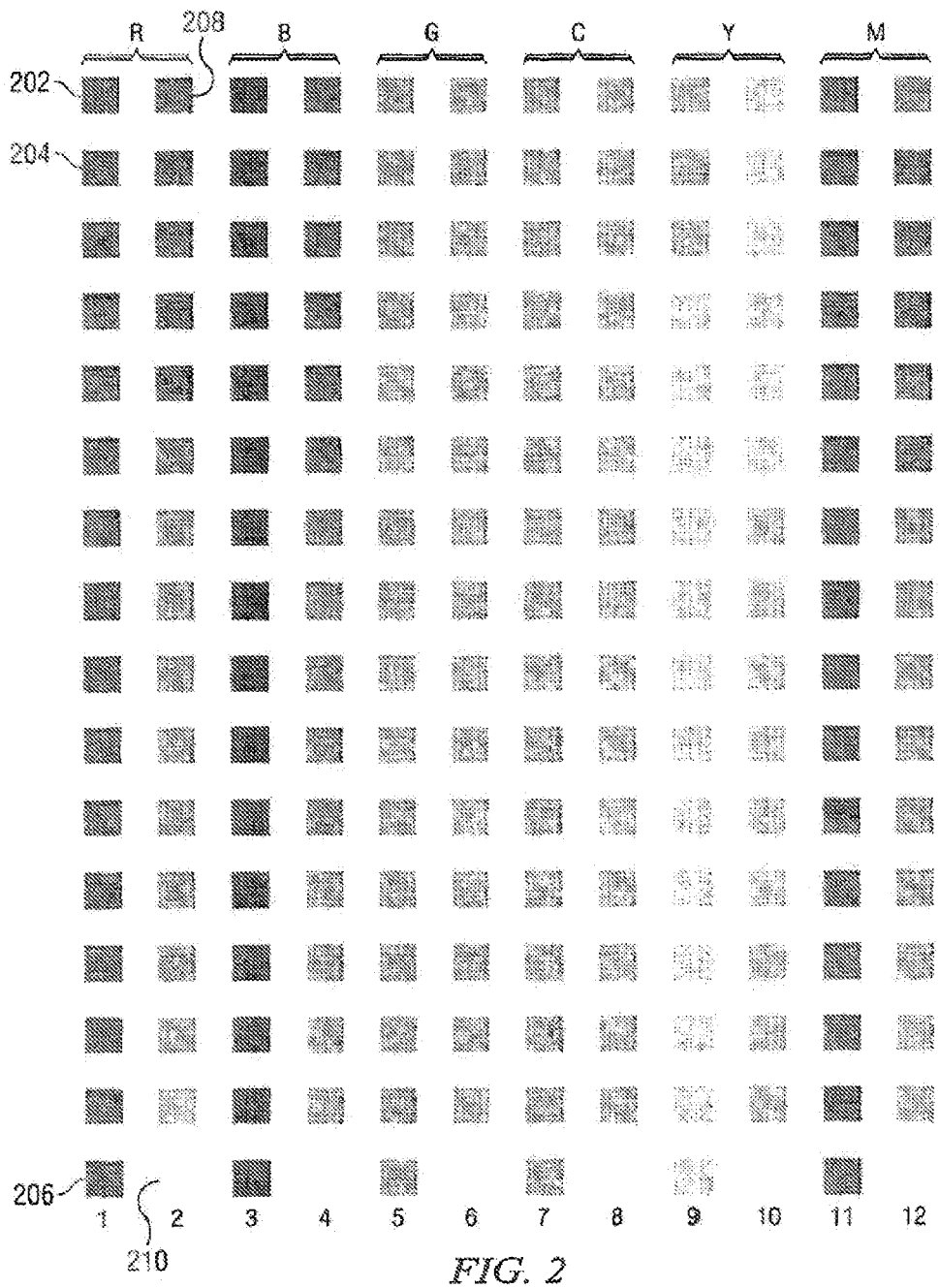
FIG. 2 is an example test sheet with six fully saturated colors in the set of original colors, in an example embodiment of the invention.

FIG. 2 is an example test sheet with six fully saturated colors as the set of original colors, in an example, embodiment of the invention. The six original colors are: red, green, blue, cyan, magenta, and yellow. In FIG. 2, the saturation of each of the six colors is varied. In FIG. 2, test squares for each color span two columns in the test sheet. The color red is displayed in the first two columns, where the uppermost left red square 202 contains a fully saturated value of red (255,0, 0). Moving down the leftmost column, an incremental amount of white is added to each tile to reduce the saturation. In this example, white is added in steps of 8 so the second tile 204 has the value (255,8,8). The last tile 206 in the first column will then be 15 steps away from full saturation and has a value of (255,120,120). The $16^{th}$ step 208 continues at the top of the second column and the last square 210 at the bottom of the second-column has a value of (255,248,248). The change in saturation is repeated for each color in the original set of colors. The result is a test sheet having features with a range of color values that vary in saturation across the target color palette. Additional test sheets can also examine effects on saturation values when black (instead of white) is added to each color and when the hue of a color is modified.

A test sheet that varies in saturation when black is added can be created by subtracting steps of 8. For example, the second red value in a test sheet that varies across saturation by adding black would be (247, 0, 0), and the third red value would be (239, 0, 0). A test sheet that varies in hue can be created by subtracting steps of 8 from the current color and adding steps of 8 to the desired color. For example, when shifting from red to green, the second color in the test sheet would be (247, 8, 0) and the third color would be (239, 16, 0).

Once the test sheets are printed, they are scanned and a corresponding grayscale value for each test feature is determined. A lookup table of RGB to grayscale values can be generated using the known RGB value for each test feature and its corresponding grayscale value. After generation of the lookup table, a subset of the color values can be determined which are distinctly separable in grayscale color space while still retaining some resemblance to the original colors that define the target color palette. Using the six color set of RGBCMY, the process for determining the subset of color values begins with the examination of the grayscale values for the set of original colors. Note that there are multiple solutions possible for the subset of color values, since there are more degrees of freedom than colors in our example. In some cases there may not be multiple solutions possible for the subset of color values.

Taking a real world example, the following values were obtained from a print/scan cycle of a test sheet.

TABLE 1

| Color | RGB Value | Grayscale Intensity |
|---|---|---|
| Red | (255, 0, 0) | 158 |
| Green | (0, 255, 0) | 163 |
| Blue | (0, 0, 255) | 110 |
| Cyan | (0, 255, 255) | 160 |
| Magenta | (255, 0, 255) | 148 |
| Yellow | (255, 255, 0) | 244 |

Looking at Table 1, the lowest intensity value (closest to black) is 110 which corresponds to the color blue. The highest intensity value (closest to white) is 244 which corresponds to the color yellow. In the simplest embodiment, the highest and lowest intensity values are fixed as the minimum and maximum intensity values. This ensures two colors (Y and B in this case) are unadulterated by the gray ↔ color optimization. In this example, the intensity range is 134 (maximum intensity value−minimum intensity value=intensity range, 244−110=134). When equal steps between grayscale levels is desired, the discretization of the grayscale intensity space is calculated in the following manner:

$$\text{Target Intensity Spacing} = (\text{Intensity Range})/(N-1) \qquad \text{(Equation 1)}$$

where N is the number of colors used. In the above example with six colors, the intensity spacing is equal to 26.8 (134/5=26.8). In other example embodiments of the invention, the target grayscale spacing may not be set to equal steps between each grayscale level. The grayscale steps may be set such that every other step between grayscale levels are equal. For example the first grayscale step may equal 20 grayscale values, the second grayscale step may equal 30 grayscale values, the third grayscale step may equal 20 grayscale values, and so on. Any pre-selected grayscale spacing may be used.

Figure 3:
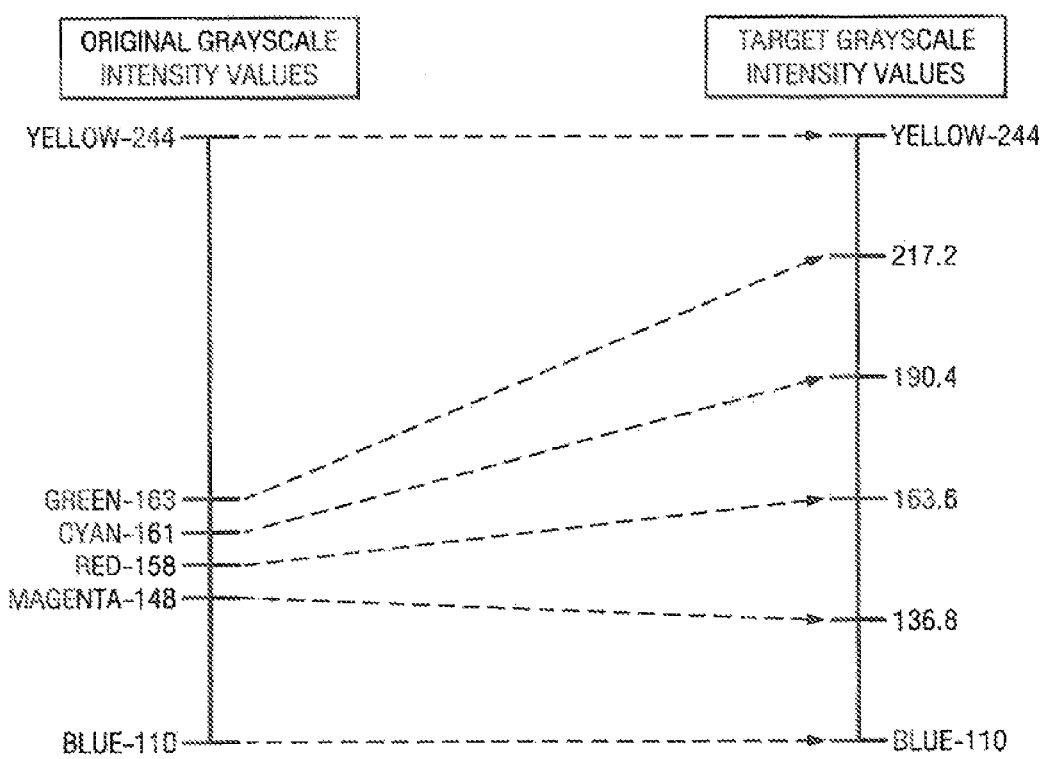
FIG. 3 depicts the mapping of current grayscale values for the original colors to the target grayscale intensity values in an example embodiment of the invention.

The next step is to select a subset of color values from the range of color values wherein the grayscale values for each of the subset of color values are separated by the target grayscale intensity spacing. This is done by taking the original colors and mapping their current grayscale values to a new target grayscale value based on the obtained intensity spacing. FIG. 3 depicts the mapping of the current grayscale values of the original colors to the target grayscale intensity values in an example embodiment of the invention.

FIG. 3 shows that the colors yellow and blue, which have the maximum and minimum values, are directly mapped to the new target values (unadulterated). The original grayscale values of the remaining 4 colors are, in this example, tightly grouped within a range of only 15 grayscale intensity levels. To obtain the separability that allows for easy detection, the four colors are mapped to new colors that have grayscale intensity values with approximately equal spacing. To obtain this spacing, the information from the test sheets generated in step 4 is used to find an RGB representation of the color which, when scanned, is closest to the target grayscale value.

Figure 4:
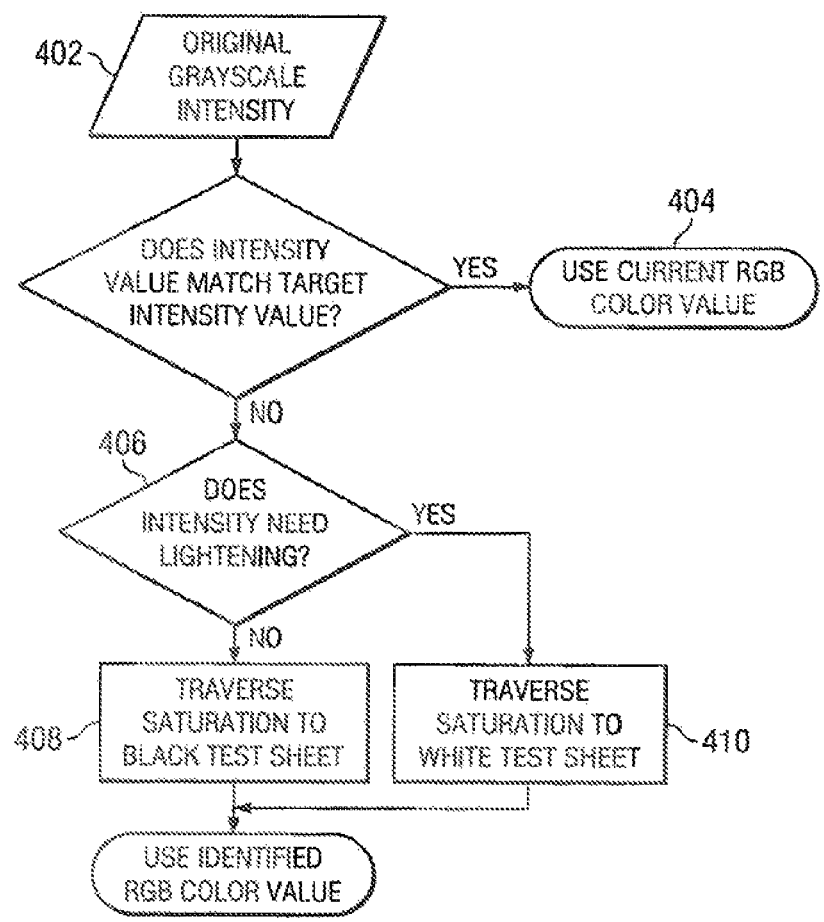
FIG. 4 is a flow chart for mapping the original colors to new grayscale values in an example embodiment of the invention.

FIG. 4 is a flow chart for mapping the original colors to new grayscale values in an example embodiment of the invention. The process for identifying the correct RGB color value starts at step 402 with examination of the current grayscale intensity value. At step 404, when the current grayscale intensity value matches the target grayscale intensity value the current RGB color value is used. When the current grayscale intensity value does not match the target grayscale intensity value, flow moves to step 406. At step 406 the current grayscale intensity value is compared to the target grayscale intensity value. When the target intensity value is darker than the current grayscale value, a new grayscale value is selected from the saturation to black test sheet at step 408. When the target intensity value is lighter than the current grayscale value, a new grayscale value is selected from the saturation to white test sheet at step 410. For example, the green target intensity is 217.2 (FIG. 3). Since this value is lighter than its original intensity of 163, the information from the saturation to white test sheet is used to locate the new green RBG value which has the closest intensity value to the target.

Table 2 (below) is a list of the grayscale intensity values and the original RGB values from the saturation to white test sheet for the color green. As can be seen by inspection of the table, when the RGB value is (160, 255, 160) the intensity value is 216.6.

TABLE 2

| Intensity | R | G | B |
|---|---|---|---|
| 161.1 | 0 | 255 | 0 |
| 162.2 | 8 | 255 | 8 |
| 164.9 | 16 | 255 | 16 |
| 167.7 | 24 | 255 | 24 |
| 169.8 | 32 | 255 | 32 |
| 173.5 | 40 | 255 | 40 |
| 176.5 | 48 | 255 | 48 |
| 179.7 | 56 | 255 | 56 |
| 182.9 | 64 | 255 | 64 |
| 184.9 | 72 | 255 | 72 |
| 187.0 | 80 | 255 | 80 |
| 189.3 | 88 | 255 | 88 |
| 192.1 | 96 | 255 | 96 |
| 195.1 | 104 | 255 | 104 |
| 197.2 | 112 | 255 | 112 |
| 200.3 | 120 | 255 | 120 |
| 201.7 | 128 | 255 | 128 |
| 204.9 | 136 | 255 | 136 |
| 208.3 | 144 | 255 | 144 |
| 212.4 | 152 | 255 | 152 |
| 216.6 | 160 | 255 | 160 |
| 220.6 | 168 | 255 | 168 |
| 224.6 | 176 | 255 | 176 |
| 228.6 | 184 | 255 | 184 |
| 233.2 | 192 | 255 | 192 |
| 236.7 | 200 | 255 | 200 |
| 239.9 | 208 | 255 | 208 |
| 242.9 | 216 | 255 | 216 |
| 247.0 | 224 | 255 | 224 |
| 251.2 | 232 | 255 | 232 |
| 253.4 | 240 | 255 | 240 |
| 254.7 | 248 | 255 | 248 |

Since this is the closest intensity value to the target value of 217.2, over the range of intensity values, the associated RGB color is selected as the new target color for green. This process is repeated for the remaining colors requiring adjustment. In this example, since the targets for cyan and red are both lighter than their corresponding initial values, the intensity values derived from the saturation to white test sheet are used. For magenta, since the target value is less than its current value (i.e. darker) the information derived from the saturation to black test sheet is used to find the closest intensity match.

In some embodiments of the invention, interpolation between values in the test sheets may be used to select colors that have grayscale values that more closely match the target grayscale value. In the example above, the difference from the target value of 217.2 to the closest value in the table of 216.6 is 0.6. Interpolating gives a value of 1.2 (0.6/4*(168−160) =1.2). Therefore the new color using interpolation would have RGB values of (161, 255, 161).

The final set of colors (without interpolation) is listed in Table 3.

TABLE 3

| | Original | | New | |
|---|---|---|---|---|
| Color | Intensity | (R, G, B) | Intensity | (R, G, B) |
| Red | 158 | (255, 0, 0) | 162.7 | (255, 32, 32) |
| Green | 163 | (0, 255, 0) | 216.6 | (160, 255, 160) |
| Blue | 110 | (0, 0, 255) | 110 | (0, 0, 255) |
| Cyan | 160 | (0, 255, 255) | 191.7 | (64, 255, 255) |
| Magenta | 148 | (255, 0, 255) | 136.5 | (223, 0, 223) |
| Yellow | 244 | (255, 255, 0) | 244 | (255, 255, 0) |

In another example embodiment of the invention, the grayscale range defined by the original colors can be expanded.

For example, in the above scenario blue and yellow had the minimum and maximum grayscale intensities with the values 110 and 244 respectively. Since the full range of 8-bit grayscale is 0 to 255, the range of blue and yellow only encompasses approximately 52% of the full grayscale range. To increase the overall grayscale range, the color blue may be remapped to a different blue color having a lower (or darker) grayscale value and/or the color yellow may be remapped to a different yellow having a higher (or lighter) grayscale value. Because the new blue color should be darker, the new blue color is selected from the saturation to black test sheet.

Removing too much saturation from the blue color may result in a black-like color selection. To prevent this from occurring, a minimum threshold may be set in the system to restrict the selection of colors to a subset of those available from the saturation to black test sheets. A maximum threshold may also be set for the saturation to white test sheet, where selection of certain RGB value sets would result in a color value too close to white. Setting a minimum threshold for blue of 127 (e.g. a minimum of 127 out of 255) suffices in this case. Table 4 lists the RGB values and scanned grayscale values for the blue color on the saturation to black test sheet. Using the minimum threshold of 127, a new blue color is selected. The result is that the new blue color has an RGB value (0,0,127). The new blue color has a grayscale value of 88.9.

TABLE 4

| Intensity | R | G | B |
|---|---|---|---|
| 111.8 | 0 | 0 | 255 |
| 110.2 | 0 | 0 | 247 |
| 109.2 | 0 | 0 | 239 |
| 107.9 | 0 | 0 | 231 |
| 105.2 | 0 | 0 | 223 |
| 104.3 | 0 | 0 | 215 |
| 103.5 | 0 | 0 | 207 |
| 101.7 | 0 | 0 | 199 |
| 100.8 | 0 | 0 | 191 |
| 99.0 | 0 | 0 | 183 |
| 96.6 | 0 | 0 | 175 |
| 96.5 | 0 | 0 | 167 |
| 95.5 | 0 | 0 | 159 |
| 93.6 | 0 | 0 | 151 |
| 91.9 | 0 | 0 | 143 |
| 91.4 | 0 | 0 | 135 |
| 88.9 | 0 | 0 | 127 |
| 86.7 | 0 | 0 | 119 |
| 84.7 | 0 | 0 | 111 |
| 82.8 | 0 | 0 | 103 |
| 80.1 | 0 | 0 | 95 |
| 77.9 | 0 | 0 | 87 |
| 74.3 | 0 | 0 | 79 |
| 70.9 | 0 | 0 | 71 |
| 66.8 | 0 | 0 | 63 |
| 61.0 | 0 | 0 | 55 |
| 56.2 | 0 | 0 | 47 |
| 51.3 | 0 | 0 | 39 |
| 44.1 | 0 | 0 | 31 |
| 37.5 | 0 | 0 | 23 |
| 21.6 | 0 | 0 | 15 |
| 10.3 | 0 | 0 | 7 |

This process may also be repeated for the yellow color to further increase its intensity towards 255 by examining intensity values from the saturation to white test sheet. The end result of this process is that the range which the intensity values span is increased, thereby increasing the color to color spacing. If in this example, yellow is held at 244 and blue is set to 88.9, the overall range is increased from 134 to 155.1. The remaining colors may then be assigned as previously discussed.

In another example embodiment of the invention, the subset of color values selected from the range of color values (step 5 in the selection of the colors for the color based target) are chosen such that the overall change in color values is minimized. This approach is performed in several steps. First, discretize the grayscale space as originally discussed. As with the previous examples, yellow and blue are chosen as the end points since they best encompass the extremes. Then, at each grayscale step, find the required color value for each color to match that specific intensity value. Since there are 4 colors and 4 target intensities, there are $4^4$ or 256 possible combinations. If we incorporate the expanded range technique described above, then the possible assignments of the remaining 4 colors taken from the scanned saturation test sheets can be extracted as seen in Table 5.

TABLE 5

| | Target Intensity | | | |
|---|---|---|---|---|
| Color | 120 | 151 | 182 | 213 |
| Magenta | (151, 0, 151) | (255, 24, 255) | (255, 88, 255) | (255, 168, 255) |
| Red | (135, 0, 0) | (183, 0, 0) | (255, 151, 151) | (255, 168, 168) |
| Cyan | (0, 119, 119) | (0, 159, 159) | (40, 255, 255) | (120, 255, 255) |
| Green | (0, 127, 0) | (0, 207, 0) | (48, 255, 48) | (152, 255, 152) |

Each RGB triplet in Table 5 is the closest matching RGB value to the target intensity for the given color. Examination of Table 5 shows that the ordered approach taken in the expanded range example embodiment (above) is present in the diagonal of the table. If we adhere to previous constraints in that colors may not traverse more than 16 steps on the saturation sheets (i.e. a maximum and minimum threshold of 245 and 127 respectively), then examination of the values in Table 5 shows that at 213 all colors except cyan violate this constraint. Setting cyan to 213, the combination that results in the minimization of the overall change in color values is magenta—120, red—151, green—182.

The minimization function looks at the number of steps and attempts to reduce the total step count. A step is defined as changing from one test feature to the next test feature in the sequence of test features for a given color. For example, moving from square 202 (in FIG. 2) down the leftmost column, to the second tile 204, is a step of 1. The total step count for a given combination is then:

$$\text{Total Steps} = \text{Steps}_{MAGENTA} + \text{Steps}_{RED} + \text{Steps}_{CYAN} + \text{Steps}_{GREEN}$$

The equation listed above is for use when only 4 colors are being re-mapped. When a different number of colors are being re-mapped, there would be a different number of terms in the equation. If a test sheet increases or decreases the total number of steps, for example 64 squares per color as opposed to 32 as illustrated by the test sheets in FIG. 2, the traversal process is still the same.

In another example embodiment of the invention, both the hue and the saturation of colors are varied to best achieve a color set to hit the required intensity values. In this approach a test sheet or set of test sheets that vary in hue are printed, scanned, and analyzed. These test sheets traverse the hue space and examine effects in the shift of the hue on the grayscale intensity. Used in conjunction with the saturation test sheets, a very large color space is examined and utilized for determining an ideal set of RGB values to deploy for the required color set.

What is claimed is:

1. A color target, comprising:
a plurality of marks arranged on a substrate wherein the plurality of marks are of a plurality of colors and each of the plurality of colors, when converted into a grayscale space, have a corresponding grayscale value wherein each grayscale value is spaced apart by a predetermined amount.

2. The color target of claim 1, wherein not more than two of the plurality of colors are fully saturated.

3. The color target of claim 1 wherein the predetermined amount is a constant that creates an equal spacing between each grayscale value.

4. The color target of claim 1, wherein the conversion into grayscale space takes place in a scanner.

5. The color target of claim 1, wherein the corresponding grayscale values are used to encode information into the color target.

6. A method for reading a color target, comprising:
scanning a plurality of marks on the color target wherein the plurality of marks are of a plurality of colors;
determining at least one encoded value contained in the color target by using a grayscale value corresponding to each of the plurality of colors wherein the grayscale values are spaced apart by a predetermined amount.

7. The method for reading a color target of claim 6, wherein the color target is scanned using a single channel scanner.

8. The method for reading a color target of claim 6, wherein the color target is scanned using a color scanner.

9. The method for reading a color target of claim 8, wherein the color scanner uses an NTSC color to grayscale conversion function.

10. The method for reading a color target of claim 6, wherein the grayscale value for each of the plurality of colors are spaced apart by an equal amount.

11. A method for fabricating a color target, comprising:
selecting a set of N initial colors that define a color palette wherein N is at least three;
printing, using a printing process on a selected substrate material, a set of color marks having a range of color values across the color palette, wherein the range of color values includes the initial colors;
scanning, the color marks and generating a grayscale value corresponding to each of the color values in the range of color values;
selecting a subset of color values from the range of color values wherein the grayscale values for each of the subset of color values are separated with a predefined grayscale spacing;
printing, using the printing process on the selected substrate material, the color target, wherein the color target has a plurality of features and wherein the plurality of features are of a plurality of colors and the plurality of colors are selected from the subset of color values.

12. The method for fabricating a color target of claim 11, wherein the range of color values vary in saturation across the color palette.

13. The method for fabricating a color target of claim 11, wherein the range of color values vary in hue across the color palette.

14. The method for fabricating a color target of claim 11, wherein selecting the subset of color values from the range of color values, comprises;
selecting a first color value from the range of color values that corresponds to a highest grayscale value;
selecting a second color from the range of colors that corresponds to a lowest grayscale value;
determining the predefined grayscale spacing wherein the predefined grayscale spacing is equal to an intensity range divided by N−1, wherein the intensity range equals the highest grayscale value minus the lowest grayscale value.

15. The method for fabricating a color target of claim 11, wherein the selecting a subset of color values from the range of color values minimizes the overall change in color values.

16. The method for fabricating a color target of claim 11, wherein at least two of the subset of color values correspond to two of the initial colors.

* * * * *

UNITED STATES PATENT AND TRADEMARK OFFICE
CERTIFICATE OF CORRECTION

PATENT NO. : 8,610,977 B2
APPLICATION NO. : 13/258284
DATED : December 17, 2013
INVENTOR(S) : Jason S. Aronoff et al.

Page 1 of 1

It is certified that error appears in the above-identified patent and that said Letters Patent is hereby corrected as shown below:

In the Claims

In column 9, line 11, in Claim 3, delete "1" and insert -- 1, --, therefor.

In column 10, line 3, in Claim 11, delete "scanning," and insert -- scanning --, therefor.

In column 10, line 24, in Claim 14, delete "comprises;" and insert -- comprises: --, therefor.

Signed and Sealed this
Sixth Day of May, 2014

Michelle K. Lee
*Deputy Director of the United States Patent and Trademark Office*